(12) United States Patent
Vähäsalo et al.

(10) Patent No.: US 11,001,777 B2
(45) Date of Patent: May 11, 2021

(54) METHOD OF CONVERTING BIOMASS

(71) Applicant: CH-Bioforce Oy, Espoo (FI)

(72) Inventors: Lari Vähäsalo, Espoo (FI); Nicholas Lax, Espoo (FI); Sebastian Von Schoultz, Espoo (FI)

(73) Assignee: CH-Bioforce Oy, Espoo (FI)

( * ) Notice: Subject to any disclaimer, the term of this patent is extended or adjusted under 35 U.S.C. 154(b) by 35 days.

(21) Appl. No.: 16/314,685

(22) PCT Filed: Jul. 3, 2017

(86) PCT No.: PCT/FI2017/050499
§ 371 (c)(1),
(2) Date: Jan. 2, 2019

(87) PCT Pub. No.: WO2018/002451
PCT Pub. Date: Jan. 4, 2018

(65) Prior Publication Data
US 2019/0316051 A1    Oct. 17, 2019

(30) Foreign Application Priority Data

Jul. 1, 2016  (FI) ..................................... 20165558

(51) Int. Cl.
*C10L 5/44* (2006.01)
*C10L 9/08* (2006.01)
*D21C 1/02* (2006.01)

(52) U.S. Cl.
CPC ................. *C10L 5/442* (2013.01); *C10L 9/08* (2013.01); *D21C 1/02* (2013.01); *C10L 2230/14* (2013.01);
(Continued)

(58) Field of Classification Search
CPC ........ C10L 5/442; C10L 9/08; C10L 2230/14; C10L 2230/22; C10L 2290/08;
(Continued)

(56) References Cited

U.S. PATENT DOCUMENTS 8,906,657 B2 * 12/2014 Retsina ................... C12P 19/02
  435/165
9,624,449 B2 *  4/2017 Howard .................... C10L 5/44
(Continued)

FOREIGN PATENT DOCUMENTS

CN    1352716 A      6/2002
CN  102226317    * 10/2011
(Continued)

OTHER PUBLICATIONS

Leppänen et al: Pressurized hot water extraction of Norway spruce hemicelluloses using a flow-through system. Eood Science and Technology, May 1, 2011, vol. 45, No. 2, pp. 223-236.

*Primary Examiner* — Cephia D Toomer
(74) *Attorney, Agent, or Firm* — Laine IP Oy

(57) ABSTRACT

Increasing of the heating value of combustible biomass through hemicellulose extraction and subsequent press-drying is described. After hemicellulose extraction the remaining biomass is soft and easily press-dried to high dry content of up to 80%. The method involves the removal of most water binding hemicelluloses and retaining most of the lignin in the biomass. Lignin can either be retained in the biomass during the extraction or combining the lignin, which has been separated from the hemicellulose extract, with the extracted biomass.

12 Claims, 2 Drawing Sheets

(52) U.S. Cl.
CPC ....... *C10L 2230/22* (2013.01); *C10L 2290/08* (2013.01); *C10L 2290/146* (2013.01); *C10L 2290/148* (2013.01); *C10L 2290/28* (2013.01); *C10L 2290/30* (2013.01); *C10L 2290/544* (2013.01)

(58) Field of Classification Search
CPC ......... C10L 2290/146; C10L 2290/148; C10L 2290/28; C10L 2290/30; C10L 2290/544
See application file for complete search history.

(56) References Cited

U.S. PATENT DOCUMENTS

| | | | |
|---|---|---|---|
| 2014/0096923 A1* | 4/2014 | Retsina | C12P 7/10 162/14 |
| 2015/0004654 A1 | 1/2015 | Retsina et al. | |
| 2015/0037859 A1 | 2/2015 | Bootsma | |
| 2015/0167969 A1 | 6/2015 | Retsina et al. | |

FOREIGN PATENT DOCUMENTS

| | | |
|---|---|---|
| CN | 102561082 A | 7/2012 |
| EA | 018491 B1 | 8/2013 |
| RU | 2525163 C2 | 8/2014 |
| WO | WO2009122018 A2 | 10/2009 |
| WO | WO2013162355 A1 | 10/2013 |
| WO | WO2014009604 A1 | 1/2014 |

\* cited by examiner

METHOD OF CONVERTING BIOMASS

TECHNICAL FIELD

The present invention relates the conversion of biomass. In particular, the present invention relates to a method of converting biomass, such as fresh biomass, into a modified biomass composition which is suitable for use as a fuel.

The present invention also concerns modified biomass and use thereof.

BACKGROUND ART

A common problem with biomass combustion is that fresh biomass typically cannot be used as such due to its rather high water content of ca. 60%. Further, fresh wood chips are difficult to dewater through pressing. Instead logs or chips need to be stored for prolonged times in order for the water content to decrease through air drying at ambient temperature. Drying at high temperatures will increase the rate of water removal but is not economically feasible. In addition storage of biomass, especially coniferous trees, volatile organic compounds (VOC) such as Terpenes and Isoprenes, which have very high heating value, are lost.

During storage for prolonged periods of time significant amounts of the biomass (10 to 15%) are degraded mostly through microbial activity (Heinek et al., 2013). Microbial degradation reduces the heating value of the biomass, and the economic consequences of using degraded biomass compared to the use of fresh biomass are significant.

The preparation of pellets from biomass has been discussed in the art. US 2015167969 describes the use of hot water extraction for preparation of biomass pellets and fermentable sugars and US 2015037859 discloses a method of producing lignin pellets from biomass.

SUMMARY OF INVENTION

Technical Problem

It is as aim of the present invention to eliminate at least a part of the problems relating to the art and to provide a novel method of converting biomass into a form suitable for use as a fuel.

Solution to Problem

The present invention is based on the idea of increasing the heating value of biomass, such as fresh biomass, by reducing the water content thereof by pressing.

It has unexpected been found that when subjecting biomass, such as a wood material, e.g. wood chips, first to hemicellulose extraction, a modified biomass material is obtained which is soft and particularly suitable to be subjected to pressing for removal of water.

Thus, by pressing such modified biomass, an increase of the dry matter content of the biomass is reached which cannot be attained by pressing of the unmodified biomass, for example the fresh biomass.

Further, by subjecting the biomass to hemicelluloses extraction before pressing, such that a significant portion of the hemicelluloses is removed, the heating value of the solid matter of the biomass can further be increased, which in combination with the reduced water content will provide a modified biomass which is well suited for use as a fuel, in particular as a solid fuel. Hemicellulose extraction is preferably carried out at conditions which will leave the other wood components, such as lignin and cellulose essentially intact.

According to the present invention, biomass, in particular fresh biomass, is therefore first subjected to hot water extraction for hemicellulose extraction; the biomass thus treated is recovered; and the biomass is subjected to pressing to remove water while the biomass is still warm, in order to increase the dry matter content of the biomass to 55% by weight or more.

Using the method, a lignocellulosic biomass is produced, having a dry content of at least 90 weight-%, the biomass containing less than 50% of the hemicelluloses and at least 90 weight-% of the lignin of the corresponding lignocellulosic biomass, in particular the fresh lignocellulosic biomass. Such a lignocellulosic biomass can be used as a raw material for energy production or as a fuel.

More specifically, the method according to the present invention is mainly characterized by what is stated in the characterizing portion of claim 1.

The product of the present invention and the use thereof is characterized by what is stated in the characterizing parts of claims 15 and 16.

Advantageous Effects of Invention

As discussed above, after hemicellulose extraction the remaining biomass can be dried through press-drying or also air-dried more easily than biomass containing hemicelluloses. This enables the drying of fresh extracted biomass up to a dry content of 90% much more easily than is possible for fresh wood.

The content of hemicelluloses in the biomass is reduced. Drying of the biomass is made more efficient due to the fact that hemicelluloses are hydrophilic amorphous polymers which bind water whereas lignin is hydrophobic and cellulose is crystalline both lacking the same water retention ability as hemicellulose (Olsson et al., 2004).

In addition, during the hemicellulose extraction also metals and other mineral salts are removed to a large extent from the biomass which reduces the amount of ash and ash precipitates being formed during biomass combustion.

Furthermore, by removing the hemicelluloses the heating value of the remaining dry biomass can be increased, for example from somewhat over 18 MJ/kg to more than 19.5 MJ/kg; this is because hemicelluloses have a lower heating value, 13.6 MJ/kg, than for example lignin, 27.0 MJ/kg (Lundgren et al. 2009, Van Heiningen, 2006).

Another advantage is that the biomass is sterile from microbes due to the extraction temperature of hot water extraction, which typically range to above 150° C.

Hemicelluloses are more much more easily digested by microbes than lignin and cellulose. Therefore, storage of hemicelluloses-depleted biomass without further microbial degradation is also possible.

The extracted biomass can be used for preparation of pyrolytic oil which has an even higher heating value.

Next, embodiments of the present technology will be described in more detail with reference to the attached drawings.

DESCRIPTION OF EMBODIMENTS

Figure 1:
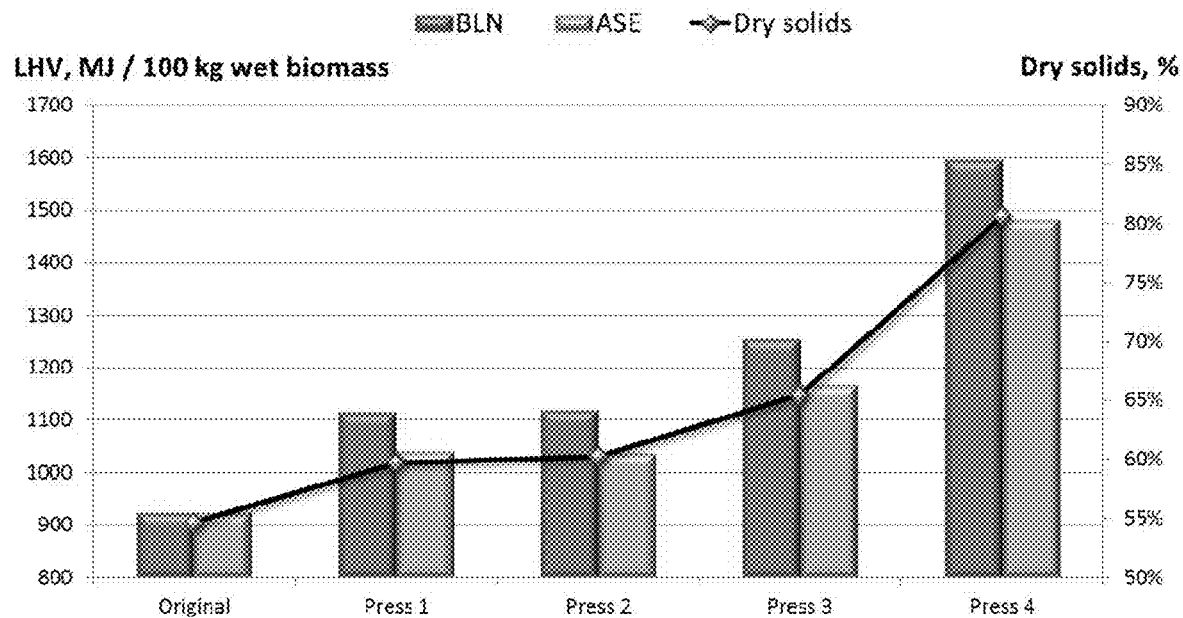
FIG. 1 shows the effect of press-drying and hemicellulose extraction technique on the lower heating value of biomass.

In one embodiment, the present method of producing a modified biomass composition having a high heating value comprises the steps of first providing fresh biomass containing cellulose, lignin and hemicelluloses; and subjecting the fresh biomass to a step of hot water extraction at a pre-determined temperature in excess of 100° C. The hot water extraction is continued so as to remove at least 50 weight-% of hemicelluloses and less than 10 weight-% of lignin from the biomass. The hot water extraction is carried out in reactor vessel, such as a pressure vessel.

Generally, "hot water extraction" stands for a method of extracting components of biomass by contacting the biomass with water or an aqueous solution at temperatures higher than about 50° C. In particular, in the present context, the hot water extraction is carried out as pressurized hot water extraction using temperatures higher than 100° C.

The extracted biomass is subjected to a further step of dewatering. In an embodiment, the biomass is recovered by removing it from the reactor and then subjected to at least one step in which water is mechanically removed.

A preferred embodiment comprises subjecting the extracted biomass to press-drying so as to achieve a biomass having a dry matter content which is higher than 50 weight-%. In particular, the extracted biomass is press-dried to a dry content of 60 to 90 weight-%.

It has been found that after the hemicellulose extraction, the biomass products, such as wood chips, are soft and that enables the pressing of them to a predetermined dry content.

In particular, the biomass is press-dried to a dry matter content which is higher than the maximum dry matter content of the corresponding non-extracted (fresh) lignocellulosic biomass upon press-drying.

During the pressing, also dissolved hemicelluloses are removed from the biomass as long as the biomass has not cooled significantly.

In one embodiment, the biomass which is subjected to press-drying has a surface temperature of more than 30° C., in particular at least 40° C. Preferably the pressing is carried out in such a way that the biomass never cools down below 35° C. between extraction and pressing. In particular, press-drying is carried out on a biomass which has not been cooled down or which has not been allowed to cool down to a surface temperature below 35° C., in particular below 40° C., between the extraction and the press-drying steps.

In one embodiment, the hemicellulose extraction is performed at temperatures below the solubility of lignin. The solubility of lignin increases significantly when hot water extraction is performed above 160° C.

One embodiment comprises carrying out the step of hot water extraction by removing at least 60 weight-% of hemicelluloses from the biomass by hot water extraction at a maximum temperature of 160° C., preferably at 135-160° C.

After extraction, the free extract is removed from the biomass either by displacement washing or any other means. After this the biomass is dried through air-drying or press-drying or a combination thereof in order to reach the desired dry content. The target dry content is in the range of 55 to 90% with at least 95% of the original lignin remaining in the biomass.

Press-drying stands for a treatment, typically a mechanical treatment, in which the material is compressed for driving out water or moisture contained in the material. In particular, the resulting biomass is press-dried using filter presses, screw presses, hydraulic presses and any other kind of press (e.g. piston-press) that can generate pressure sufficient for dewatering biomass.

In one embodiment the hemicelluloses are extracted with a method where also lignin is dissolved into the hemicellulose extract. After the extract is removed from the solid biomass, lignin is separated from the hemicellulose and mixed with the solid biomass.

In an embodiment the hemicelluloses are extracted from the biomass at temperatures above 160° C. and after at least 60 weight-% of the hemicelluloses are in solution the dissolved lignin is precipitated back to the biomass by adding a lignin precipitating chemical or lowering the temperature of the extract below the solubility of lignin or both. After the extraction the biomass is air-dried or press-dried or using a combination of the two to a dry content of at least 60 weight-%.

Another embodiment comprises carrying out the step of hot water extraction by removing at least 50 weight-%, in particular at least 60 weight-%, of hemicelluloses from the biomass by hot water extraction at a minimum temperature in excess of 160° C., in particular at a temperature of up to 220° C.

In one embodiment, the hot water extraction comprises
   removing at least 60 weight-% of hemicelluloses from the biomass by hot water extraction; and
   precipitating dissolved lignin from the extraction solution back onto the extracted biomass; and
   press-drying the resulting biomass to a dry content of at least 60 weight-%.

The hot water extraction can be carried out using technology known as "BLN-technology" disclosed in WO2014009604 and WO2015104460 (the contents of which are herewith incorporated by reference), or by precipitating the dissolved lignin back on to the biomass either inside or outside of the extraction reactor.

Lignin can be precipitated in or from a hemicellulose-containing aqueous solution of hot water extraction, by the step of
a) adding a lignin precipitating chemical to the solution; or by
b) lowering the temperature of the extraction solution below the solubility of lignin; or by
c) a combination of steps a and b.

Hemicellulose extraction can be carried out in oxygen starved environment. Oxidative reactions further lower the heating value of biomass prior to combustion.

Thus, in one embodiment, which can combined with any of the above methods of hemicellulose extraction, the hemicelluloses are removed from the biomass in an environment, in which oxygen concentration is lower than 0.1 kg oxygen/kg of said aqueous extraction solution, in order to hinder oxidative reactions in the biomass during the hot water extraction.

In the present context, the raw-material can comprise any suitable lignocellulosic material.

In particular the lignocellulosic material, such as fresh lignocellulosic biomass, can be selected from biomass comprising wood-based materials, such as genus *Pinus, Betula, Populus* or *Picea*, and/or from non-wood materials, such as bamboo, bagasse, hemp, wheat or rice straw. In one embodiment, the biomass comprises wood, in particular wood in the form of chips or saw dust, preferably crushed chips.

The present method is preferably carried using fresh biomass, i.e. biomass that has not been dried, in particular not dried to remove internal moisture, or otherwise modified to alter the chemical composition thereof before the present treatment. Example of such biomass is green wood and freshly harvested annual and perennial plants and combinations thereof. However, the method can be carried out for any biomass which contains extractable components, in particular hemicellulose or lignin or combinations thereof, in combination with for example cellulose. Thus, the biomass can be biomass which has been dried to remove at least a part of the water or moisture contained in the fresh biomass. The biomass can also be recycled or recovered biomass.

By the present technology modified biomass is provided, having, at a pre-determined dry matter content, for example at a pre-determined dry matter content of 90% or more, a heating value which is at least 10% higher than the heating value of the corresponding untreated lignocellulosic biomass, at the same dry matter content.

Thus, in one embodiment, the present, extracted and dried lignocellulosic biomass has a dry content of at least 90 weight-%, said biomass containing less than 50% of the hemicelluloses and at least 90 weight-% of the lignin of the corresponding fresh lignocellulosic biomass. The biomass contains at least 90 weight-% of the cellulose of the corresponding lignocellulosic biomass. The material can be used as a raw material for energy production or as a fuel.

EXAMPLES

Example 1

Hemicellulose was extracted from the pine (*Pinus sylvestris*) chips using two methods: the so-called BLN-technology (WO2014009604) and a more traditional batch extraction using an Accelerated Solvent Extractor (Dionex ASE 200) operated at a temperature of 170° C. for 60 minutes. The composition of the original biomass was: water 46%, cellulose 23%, lignin 16% and hemicellulose 15%.

After the extractions the biomass was drained from free water and dissolved hemicelluloses. The BLN extract contained 1% and the ASE extract contained 11% of the lignin in the original biomass. The remaining biomass after the BLN extraction and drainage of the extract had the following composition: water 75%, cellulose 13%, lignin 9% and hemicellulose 3%. Correspondingly, after the ASE extraction the composition was: water 75%, cellulose 14%, lignin 8% and hemicellulose 3%.

The drained and warm (ca. 60° C.) biomass was then press-dried using a screw-press with four different pressure settings to the following dry-contents: 59%, 60%, 66% and 80% and the resulting hemicellulose content of the wet chips were 2%, 2%, 1.5% and 1%, respectively. In FIG. 1 the lower heating value (LHV) for 100 kg wet original biomass is compared with extracted and press-dried biomass from the two extractions.

As expected the LHV follows the dry content of the biomass. By press-drying of hemicellulose extracted biomass is possible to reach 80% dry content which increases the LHV to 172% compared to the original biomass. Another significant finding was that the LHV of the BLN extraction was on average 8% higher compared to the ASE extractions. During the ASE extraction some air is present inside the extraction vessel, which partly through oxidative processes explains the difference between the extraction techniques.

The results clearly demonstrates that using a hemicellulose extraction technique which operates in oxygen starved environments and does not dissolve lignin from the biomass is superior with regard to heat energy.

Example 2

Figure 2:
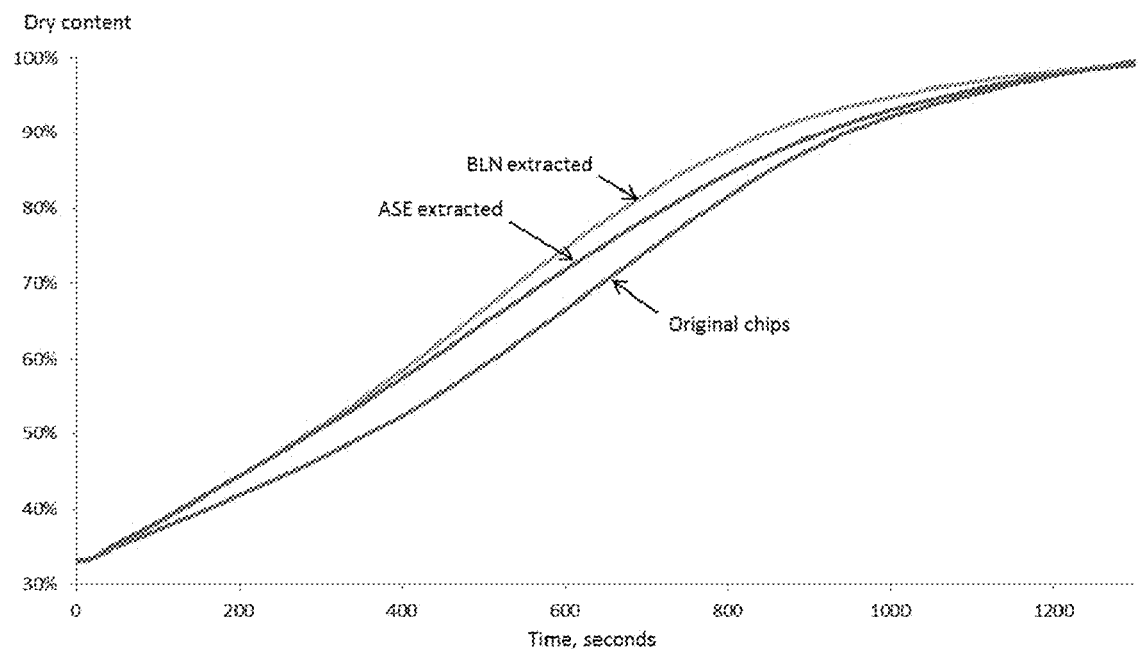
FIG. 2 shows the drying speed of 2 grams of wet biomass after hemicellulose extraction. The ASE extraction technique dissolves some of the lignin which most likely clogs some of the porous structure making the drying slower compared to the BLN technique.

In order to evaluate the effect of hemicellulose removal technique on air-drying of wood chips, the original and the un-pressed hemicellulose extracted chips from example 1 were air-dried on an infra-red scale. Before drying all the chips were soaked in 40° C. water for 15 min followed by centrifugation. The resulting dry content of the chips were 33% in all three cases. FIG. 2 shows the drying speed of the three samples. The results show that hemicellulose extracted chips are air-dried approximately 10%-20% faster than un-extracted chips. Hemicelluloses are hygroscopic polymers which retain water, after hemicellulose extraction the pore structure is more beneficial for air-drying. It was also surprising that the effect of extraction technique had such a large effect. The ASE extracted is extracted at 170° C. whereas the BLN extraction is done at 150° C. The increased solubility of lignin at higher temperatures during the ASE extraction most likely clogs the pores of the fibers to some extent making air-drying slower compared the BLN extraction procedure.

Example 3

Figure 3:
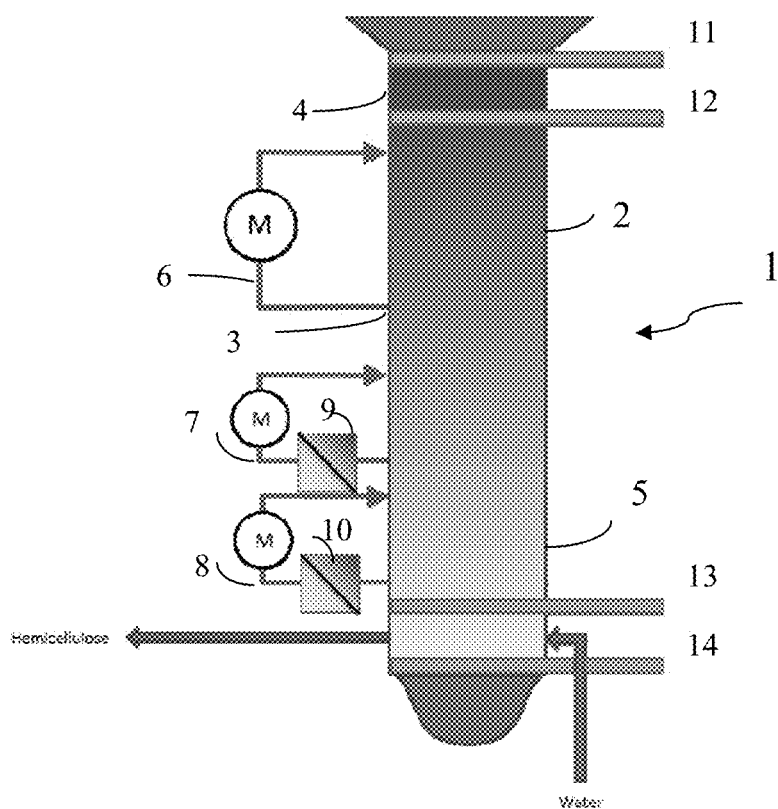
FIG. 3 gives a schematic depiction of the reactor used in Example 3.

In this example, the effect of lignin precipitation on the LHV of wood chips were investigated. Fresh birch wood chips were extracted in a continuous down-flow reactor. A schematic of the reactor is shown in FIG. 3. Reference numeral 1 refers to the reactor.

The upper section 2 of the reactor 1 was kept between 150° C. and 170° C. with a residence time of approximately 60 minutes and constant circulation of the extract from the lower part 3 to the upper part 4 of the upper section 2 of the reactor. In the lower section 5 of the reactor the extract was cooled down to 60° C.

The lower section 5 of the reactor 1 had two circulation loops 6, 7 equipped with heat exchangers 8, 9.

Depending on the applied heat in the upper section various amounts of lignin is dissolved into the hemicellulose extract. Lignin can be deposited back onto the wood chips by lowering the temperature of the hemicellulose extract inside the reactor.

With regard to this technology reference is made to copending patent application FI20165264, titled "Method for producing hemicellulose extract", the content of which is herewith incorporated by reference.

Four chips fractions were produced with varying amount of lignin removed from the biomass during the hemicellulose extraction: A: 0.1%, B: 4.9%, C: 8.9% and D: 14%. After the hemicellulose extraction the warm wood chips were press-dried to 80% dry solids. The overall removal of hemicellulose was approximately 90% for all samples. The chips were then oven-dried at 105° C. and the higher heating HHV of the chips were measured.

Figure 4:
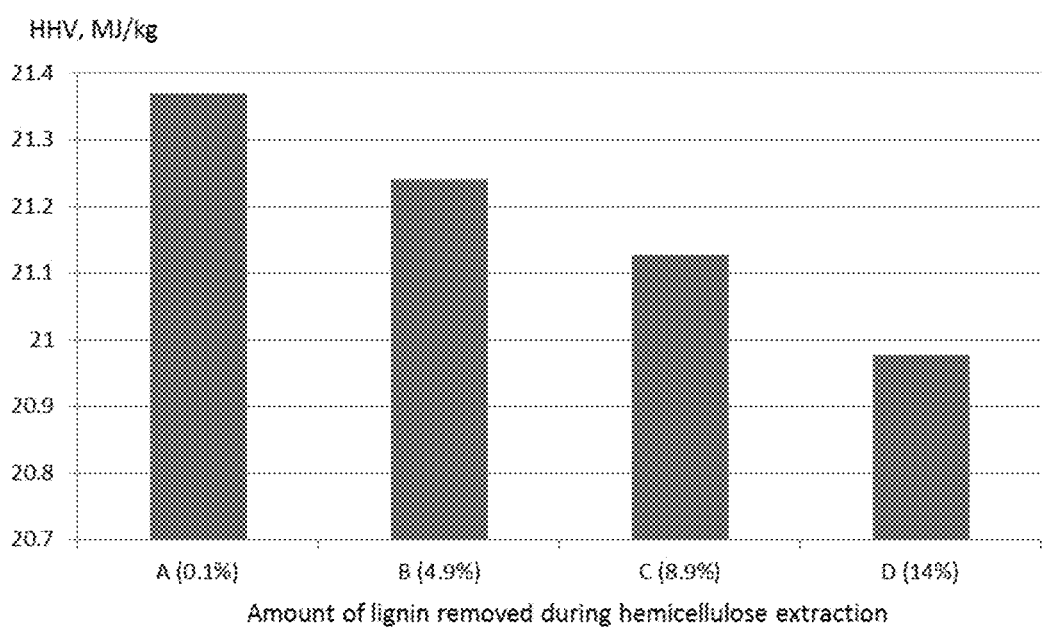
FIG. 4 is a bar chart showing the effect of lignin removal from the biomass during hemicellulose extraction on the higher heating value (HHV) of the remaining biomass.

The HHV results are shown in FIG. 4.

In the following, a number of embodiments are given:
1. A method of producing a modified biomass composition having a high heating value, comprising the steps of providing fresh biomass containing cellulose, lignin and hemicelluloses;

subjecting the fresh biomass to a step of hot water extraction at a pre-determined temperature in excess of 100° C.;

continuing the hot water extraction so as to remove at least 50 weight-% of hemicelluloses and less than 10 weight-% of lignin from the biomass so as to produce an extracted biomass;

recovering the extracted biomass, and subjecting the warm, extracted biomass to press-drying so as to achieve a biomass having dry matter content which is higher than 50 weight-%.

2. The method of embodiment 1, comprising press-drying the biomass which has a surface temperature of more than 30° C., in particular at least 40° C.

3. The method of embodiment 1 or 2, comprising press-drying biomass which has not been cooled down to a surface temperature below 35° C., in particular below 40° C., between the extraction and the press-drying steps.

4. The method of any of embodiments 1 to 3, wherein the biomass is press-dried to a dry matter content which is higher than the maximum dry matter content of press dried fresh lignocellulosic biomass.

5. The method of any of the preceding embodiments, comprising carrying out the step of hot water extraction by removing at least 60 weight-% of hemicelluloses from the biomass by hot water extraction at a maximum temperature of 160° C., preferably at 135-160° C., and then press drying the resulting biomass.

6. The method of any of embodiments 1 to 4, comprising carrying out the step of hot water extraction by removing at least 50 weight-%, in particular at least 60 weight-%, of hemicelluloses from the biomass by hot water extraction at a minimum temperature in excess of 160° C., in particular at a temperature of up to 220° C.

7. The method of any of the preceding embodiments, comprising carrying out the step of hot water extraction by removing at least 60 weight-% of hemicelluloses from the biomass by hot water extraction; and precipitating dissolved lignin from the extraction solution back onto the extracted biomass; and press-drying the resulting biomass to a dry content of at least 60 weight-%.

8. The method of any of the preceding embodiments, comprising removing hemicelluloses from the biomass in an oxygen starved environment using an aqueous extraction solution, in particular hemicelluloses are removed from the biomass in an environment, in which oxygen concentration is lower than 0.1 kg oxygen/kg of said aqueous extraction solution, in order to hinder oxidative reactions in the biomass during the hot water extraction.

9. The method of any of the preceding embodiments, comprising extracting hemicelluloses from the biomass using an aqueous solution in which the amount of oxygen is less than 0.01 kg oxygen/kg of said aqueous solution, preferably less than 0.005 kg oxygen/kg of said aqueous solution, in particular less than 0.0001 kg oxygen/kg of said aqueous solution during extraction.

10. The method of any of the preceding embodiments, wherein lignin is precipitated in or from a hemicellulose-containing aqueous solution of hot water extraction, by the step of a) adding a lignin precipitating chemical to the solution; or by b) lowering the temperature of the extraction solution below the solubility of lignin, or by c) a combination of steps a and b.

11. The method to any of the preceding embodiments, wherein the extracted biomass is press-dried to a dry content of 60 to 90 weight-%.

12. The method of any of the preceding embodiments, wherein the fresh lignocellulosic biomass comprises wood, in particular the biomass is formed by chips or saw dust, preferably crushed chips.

13. The method of any of the preceding embodiments, comprising recovering biomass having, at a pre-determined dry matter content, a heating value which is at least 10% higher than the heating value of the corresponding untreated lignocellulosic biomass, at the same dry matter content.

14. Lignocellulosic biomass having a dry content of at least 90 weight-%, said biomass containing less than 50% of the hemicelluloses and at least 90 weight-% of the lignin of the corresponding fresh lignocellulosic biomass, and use of such lignocellulosic biomass as a raw material for energy production or as a fuel.

INDUSTRIAL APPLICABILITY

The present invention can be applied for modification of biomass used as a fuel in boilers and furnaces where biomass conventionally is used, such as in district heating facilities. The economic consequences from the ability to press to use fresh wood instead of stored wood in biomass combustion are huge. Another great advantage from this method is that the biomass can be press-dried to a significantly higher dry content compared to fresh wood. In theory the removal of the hemicelluloses which represent 25% of the dry matter of biomass does not reduce the lower heating value of the remaining biomass. In other words the remaining 75% dry solids has the same or higher heat energy content as the original 100% dry solids mainly due to lower water content. This enables biomass combustion plants to produce the same amount of energy from a significantly smaller amount of wet biomass which will cut the cost of fuel storage facilities. Additionally the lower ash content makes biomass combustion less prone to ash deposits and thereby downtime for the process. The biomass can be used for producing pyrolytic oil having a high heating value.

REFERENCE SIGNS LIST

1 Reactor
2 Upper section of reactor
3 Lower part of upper section
4 Upper part of upper section
5 Lower section of reactor
6, 7, 8 Circulation loop
9, 10 Heat exchanger
11-14 Valve
M Flow rate meter

CITATION LIST

Patent Literature

WO2014009604
WO2009122018
US2015167969
US2015037859

Non-Patent Literature

Lundgren, Joakim; Helmerius, Jonas, "Integration of a hemicellulose extraction process into a biomass based heat and power plant", *Proceedings of ECOS* 2009: 22*nd International Conference on Efficiency, Cost, Optimization Simulation and Environmental Impact of Energy Systems*. Foz do Iguaçú: ABCM, Brazilian Society of Mechanical Sciences and Engineering, 2009

Leppanen et al.: "Pressurized hot water extraction of Norway spruce hemicelluloses using a flow-through system", *Wood Sci Technol* (2011) 45:223-236

Van Heiningen, A., "Converting a kraft pulp mill into an integrated forest biorefinery." *Pulp and Paper Canada*, 2006, p. 141-146

Heinek S. et al.: "Biomass conditioning degradation of biomass during the storage of woodchips", 21th European Biomass Conference, Copenhagen, 2013, p.

Olsson A-M. and Salmén, L.: "The association of water to cellulose and hemicellulose in paper examined by FTIR spectroscopy". *Carbohydrate Research* 339(4):813-8, April 2004.

The invention claimed is:

1. A method of producing a modified biomass composition having a high heating value, comprising the steps of
   providing biomass containing cellulose, lignin and hemicelluloses;
   subjecting the biomass to a step of hot water extraction at a pre-determined temperature in excess of 100° C. by removing at least 60 weight-% of hemicelluloses from the biomass by hot water extraction; and
   precipitating dissolved lignin from the extraction solution back onto the extracted biomass:
   continuing the hot water extraction so as to remove less than 10 weight-% of lignin from the biomass so as to produce an extracted biomass;
   recovering the extracted biomass; and
   subjecting the extracted biomass to press-drying so as to achieve a biomass having dry matter content which is higher than 60 weight-%.

2. The method according to claim 1, further comprising press-drying the biomass which has a surface temperature of more than 30° C.

3. The method according to claim 1, further comprising press-drying biomass which has not been cooled down to a surface temperature below 35° C. between the extraction and the press-drying steps.

4. The method according to claim 1, wherein the biomass is press-dried to a dry matter content which is higher than the maximum dry matter content of press dried fresh lignocellulosic biomass.

5. The method according to claim 1, further comprising carrying out the step of hot water extraction by removing at least 60 weight-% of hemicelluloses from the biomass by hot water extraction at a maximum temperature of 160° C. and then press drying the resulting biomass.

6. The method according to claim 1, wherein the biomass is subjected to hot water extraction at a minimum temperature in excess of 160° C.

7. The method according to claim 1, further comprising removing hemicelluloses from the biomass in an oxygen starved environment using an aqueous extraction solution in order to hinder oxidative reactions in the biomass during the hot water extraction.

8. The method according to claim 1, further comprising extracting hemicelluloses from the biomass using an aqueous solution in which the amount of oxygen is less than 0.01 kg oxygen/kg of said aqueous solution during extraction.

9. The method according to claim 1, wherein lignin is precipitated in or from a hemicellulose-containing aqueous solution of hot water extraction, by the step of
   a) adding a lignin precipitating chemical to the solution; or
   b) lowering the temperature of the extraction solution below the solubility of lignin; or
   c) a combination of steps a and b.

10. The method according to claim 1, wherein the extracted biomass is press-dried to a dry content of 60 to 90 weight-%.

11. The method according to claim 1, wherein the lignocellulosic biomass comprises wood, in particular the biomass is formed by chips or saw dust.

12. The method according to claim 1, further comprising recovering biomass having, at a pre-determined dry matter content of 90% or more, a heating value which is at least 10% higher than the heating value of a corresponding untreated lignocellulosic biomass, at the same dry matter content.

* * * * *